(12) United States Patent  
Scherenberger et al.

(10) Patent No.: US 9,014,840 B2  
(45) Date of Patent: Apr. 21, 2015

(54) INTEGRATED CARGO LOADING SYSTEM ARCHITECTURE

(71) Applicant: Airbus Operations GmbH, Hamburg (DE)

(72) Inventors: Sven Scherenberger, Bremen (DE); Bernd Schnoerwangen, Syke (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/760,218

(22) Filed: Feb. 6, 2013

(65) Prior Publication Data

US 2013/0158700 A1 Jun. 20, 2013

Related U.S. Application Data

(63) Continuation of application No. PCT/EP2011/063537, filed on Aug. 5, 2011.

(60) Provisional application No. 61/371,353, filed on Aug. 6, 2010.

(30) Foreign Application Priority Data

Aug. 6, 2010 (DE) .......................... 10 2010 033 568

(51) Int. Cl.
    *G06F 7/00* (2006.01)
    *B64F 1/32* (2006.01)
    *B64D 9/00* (2006.01)

(52) U.S. Cl.
    CPC ... *B64F 1/32* (2013.01); *B64D 9/00* (2013.01); *B64D 2009/006* (2013.01); *Y02T 50/46* (2013.01)

(58) Field of Classification Search
    USPC ........................................................ 700/213
    See application file for complete search history.

(56) References Cited

U.S. PATENT DOCUMENTS 6,683,442 B1 * 1/2004 Ferencz et al. ................ 323/274
6,695,555 B2     2/2004 Eilenstein et al.
(Continued)

FOREIGN PATENT DOCUMENTS

DE     102009037982 A1     5/2010

OTHER PUBLICATIONS

International Searching Authority, Written Opinion dated Oct. 19, 2011 for International Application No. PCT/EP2011/063537.
(Continued)

*Primary Examiner* — Gene Crawford
*Assistant Examiner* — Kyle Logan
(74) *Attorney, Agent, or Firm* — Ingrassia Fisher & Lorenz, P.C.

(57) ABSTRACT

A cargo loading system for a cargo compartment of a means of transport, for example a cargo aircraft or a passenger aircraft, is provided. The system includes at least one power drive unit for transporting cargo of the means of transport. The power drive unit and a control module are coupled to a BUS system. The control module generates control signals for the power drive unit and maintenance data of the power drive unit for the control and maintenance of the power drive unit. The BUS system transmits the control signals and maintenance data of the power drive unit between the control module and the power drive unit. In this manner an existing hardware platform of the means of transport can be used, and weight and cabling as well as the number of control boxes of the means of transport can be reduced.

16 Claims, 3 Drawing Sheets

(56) References Cited

U.S. PATENT DOCUMENTS

| | | |
|---|---|---|
| 6,842,665 B2 | 1/2005 | Karlen |
| 6,867,702 B2 | 3/2005 | Huber et al. |
| 7,967,537 B2 | 6/2011 | Allert et al. |
| 8,185,234 B2 | 5/2012 | Tietjen et al. |
| 8,220,750 B2 | 7/2012 | Hettwer |
| 8,308,107 B2 | 11/2012 | Hettwer |
| 2003/0179079 A1* | 9/2003 | Huber et al. ............. 340/286.01 |
| 2009/0121084 A1* | 5/2009 | Hettwer ..................... 244/137.1 |
| 2009/0121085 A1* | 5/2009 | Hettwer ..................... 244/137.1 |
| 2010/0308180 A1* | 12/2010 | Helou, Jr. .................... 244/35 R |
| 2011/0313564 A1 | 12/2011 | Schnorwangen et al. |

OTHER PUBLICATIONS

German Patent Office, German Office Action dated Jul. 29, 2011 for Application No. 102010033568.1.

International Searching Authority, International Search Report dated Oct. 19, 2011 for International Application No. PCT/EP2011/063537.

European Patent Office, European Office Action mailed Jan. 24, 2014 for European Patent Application No. 11740666.0.

* cited by examiner

INTEGRATED CARGO LOADING SYSTEM ARCHITECTURE

CROSS-REFERENCE TO RELATED APPLICATIONS

This is a continuation of International Application No. PCT/EP2011/063537, filed Aug. 5, 2011, which application claims priority to German Patent Application No. 10 2010 033 568.1, filed Aug. 6, 2010 and to U.S. Provisional Application No. 61/371,353, filed Aug. 6, 2010, which are incorporated herein by reference in their entirety.

TECHNICAL FIELD

The technical field relates to cargo loading systems for means of transport. In particular, the technical field relates to a cargo loading system for a cargo compartment of a means of transport. Furthermore, the technical field relates to an aircraft comprising the cargo loading system and to a method for loading and unloading cargo to/from a means of transport by means of the cargo loading system.

BACKGROUND

In cargo loading systems (also called control and conveyance systems) dedicated controllers may be used that process and forward data and control signals from connected devices. In this process, many different ways of communication within the system and the environment of the system may be used, for example in extraneous systems.

From DE 10 2006 047 238 B4 a cargo loading system comprising guide rails and a setting device for aligning bearing parts on tolerance-associated structures is known. EP 1 110 860 A1 describes a cargo loading system for an aircraft for loading and unloading loading units, wherein roller drive units are provided for transporting the cargo, latch units are provided for locking the cargo, and control units are provided for operating the roller drive units and/or the latch units.

In addition, other objects, desirable features and characteristics will become apparent from the subsequent summary and detailed description, and the appended claims, taken in conjunction with the accompanying drawings and this background.

SUMMARY

According to various exemplary embodiments, provided are a cargo loading system/cargo loading control system for a cargo compartment of a means of transport, an aircraft comprising a corresponding cargo loading system, and a method for loading and unloading cargo to/from a means of transport by means of the cargo loading system.

According to an exemplary embodiment of the present disclosure, a cargo loading system for a cargo compartment of a means of transport is stated, which cargo loading system comprises at least one power drive unit for transporting cargo of the means of transport, a control module, and a BUS system comprising a bus. The at least one power drive unit and the control module are connected to the bus by means of data lines. The control module is designed for generating control signals for the at least one power drive unit and maintenance data of the at least one power drive unit for the control and maintenance of the at least one power drive unit. The BUS system is designed for transmitting the control signals and maintenance data of the at least one power drive unit between the control module and the at least one power drive unit.

Such a cargo loading system may make it possible for the control module to be connected to a bus of the BUS system, and to be able to communicate or exchange data, by way of the bus, with one or several power drive units that are also connected to the bus. In this arrangement the data flow is controlled by way of an access method (protocol), which can, for example, take place by means of the control module. All the connected components, for example the control module and the at least one or several power drive units, are cross-linked (networked) through the BUS system. Supplying power to the components and to the bus can take place by way of a direct-current or alternating-current supply.

With the use of such a cargo loading system with a BUS system for transmitting control signals and maintenance signals it is possible to do away with discrete lines between individual components such as the control module, and with the at least one or several power drive units, and consequently the expenditure relating to cabling is minimized, and additional components such as power drive units can be connected in a simple and flexible manner. Furthermore, when compared to conventional cargo loading systems a reduction in weight can be achieved because an already existing hardware platform can be used.

The bus can, for example, be a CAN-bus which by means of the controller area network (CAN) interconnects several components that have equal rights by way of a two-wire bus. Such a CAN-bus may have high resistance to malfunction and a real-time capability; it may also be more cost effective than conventional buses.

Maintenance data that by means of the BUS system can be transmitted between the at least one power drive unit and the control module can, for example, be fault messages of the at least one power drive unit, which fault messages can be transmitted by the control module to external units, for example to a control system.

Such a cargo loading system represents an intelligent network, by means of which network existing hardware platforms such as integrated module avionics (IMA) that are currently present in a means of transport, for example in an aircraft, can be used. In this arrangement the control module can be a cargo loading system (CLS) ATA50 or an ATA25-control module. By means of the BUS system the system components of the cargo loading system can be reduced, when compared with a cargo loading system without a BUS system, in that existing hardware platforms are used, which can result in a reduction in weight. The control module can, for example, be integrated in a central hardware platform.

The means of transport can, for example, be an aircraft such as an airplane, a helicopter or a zeppelin, or a motor vehicle, a rail vehicle, a watercraft or a spacecraft.

According to another exemplary embodiment of the present disclosure, the control module is designed for controlling the BUS system.

Such control of the BUS system by means of the control module may be associated with an advantage in that no further control module needs to be stated for controlling the BUS system, and in that the BUS system can be optimized and efficiently controlled according to the control signals and maintenance data to be transmitted.

According to another exemplary embodiment of the present disclosure, the cargo loading system furthermore comprises a control system, wherein the control module is connected to the control system. The control system is designed for transmitting and receiving the control signals and maintenance data of the at least one power drive unit by means of the control module and of the BUS system. The control system is designed for processing the control signals and maintenance data.

The control module can be connected to the control system by means of a plug-in connection, and according to another exemplary embodiment can be integrated in the control system. The control system can be a hardware platform, a central control system of an aircraft and/or a control system of the type IMA ATA42.

Such connection of a control module of the cargo loading system to a control system can, for example, provide an advantage in that information of the control system, for example relating to a driving state or transport state of the means of transport (for example depending on the flight phase), can be transmitted to the control module. For example it is thus possible, during a journey or during takeoff or landing of the means of transport, to switch off the cargo loading system by means of the control module based on information relating to the driving state or transport state, which information is transmitted to the control system.

According to another exemplary embodiment of the present disclosure, the control system, which can, for example, be a hardware platform, is designed for the connection of further modules apart from the control module. The further modules are, for example, selected from the group comprising a control system module for door systems and an undercarriage module. The cargo loading system is, among other things, designed to be switched on and off by means of at least one of the further modules on the basis of transport phases of the means of transport.

Such a cargo loading system with a control module that is connected to a (central) control system, for example a hardware platform, which cargo loading system comprises further modules, for example a control system module for doors, and an undercarriage module, makes it possible for the cargo loading system to be switched off while the means of transport is engaged in transport, for example during flight of an aircraft. According to requirements of regulatory authorities, cargo loading control systems and drive systems must be switched off during flight. Switch-off cannot be carried out solely by the control module of the aircraft (ATA50-chapter or ATA25-chapter). Data relating to the state of closure of all the doors (for example during takeoff or landing) can easily be tapped by the control system, to which, for example, the control system module for doors is connected, and can be transmitted to the bus system, which subsequently can initiate switch-off, for example by way of the electronic fuse unit or semiconductor fuse unit (for example the secondary power distribution box, SPDB) of the cargo loading system. Furthermore, the control system can detect whether the aircraft is still on the ground, for example by means of the undercarriage module connected to the control system. Thus the cargo loading system can be switched off by means of the control system, by way of the control module during a flight phase and during a takeoff and landing phase of the aircraft, in that information relating to the flight phase or to the takeoff and landing phase is transmitted by means of corresponding modules that are connected to the control system. In this manner less cabling and reduced susceptibility to malfunction can be provided. Such switching-off can also take place by way of a door system that is connected to the control system.

Furthermore, in a control system it is possible to connect modules for identifying the cargo, which modules can then transfer information relating to the cargo, by means of the control system, to the control module, which modules subsequently correspondingly control the at least one power drive unit or several power drive units. In this arrangement the cargo can, for example, be identified by means of a cargo evaluation system (CES).

According to another exemplary embodiment of the present disclosure, the control system further comprises a module interface for connecting the control module and the further modules. The module interface is designed for data exchange between the control module connected to the module interface and to the further modules connected to the module interface.

Such a cargo loading system comprising a control module that is connected to a control system with a module interface makes it possible for information to be exchanged between different modules in the means of transport, which information is relevant to the cargo to be moved or to the cargo loading system, for example, as already mentioned above, information relating to the transport phase of the means of transport, for example to a flight phase or takeoff and landing phase, by way of an undercarriage module.

According to another exemplary embodiment of the present disclosure, the control system further comprises a configuration unit that is designed for configuring the control module that is connected to the control system, wherein said configuration unit is designed for configuring further modules connected to the control system.

Such a cargo loading system with a control system that comprises a configuration unit makes it possible for several modules to be able to be connected in a simple manner to the control system, which can be the central control system of the means of transport, without there being the need to specially and expensively configure each individual module.

According to another exemplary embodiment of the present disclosure, the cargo loading system further comprises a power supply unit, wherein the BUS system is designed for cross-linking the power supply unit with the at least one power drive unit and with the control module for supplying power to the at least one power drive unit and to the control module.

The power supply unit can be designed for providing a voltage, for example about 270 V, in the form of direct voltage or alternating voltage, for the at least one power drive unit.

Such a cargo loading system, connected to a power supply unit for providing a particular voltage, makes it possible for the individual components of the cargo loading system to be able to be supplied with power by means of a single voltage, rather than, as is the case in conventional cargo loading systems, with different voltages of about 115 V and about 28 V.

According to another exemplary embodiment of the present disclosure, the BUS system with the BUS, in particular with the CAN-BUS, is designed for regulating the supply of power to the control device, the control module, the control system and a maintenance system, wherein the maintenance system and the control device can form part of the cargo loading system.

The power supply unit can comprise a fuel cell and/or a battery. According to another exemplary embodiment of the present disclosure, the power supply unit is supplied with power by a generator that is driven by a turbine.

According to another exemplary embodiment of the present disclosure, the power supply unit is connected by means of a line to the BUS system or the BUS and/or directly to the BUS. In this context the term "directly" means without any interruption, for example as a result of data lines, terminals or other electrical connections or BUSES.

According to another exemplary embodiment of the present disclosure, the power supply unit is designed for the requirement-oriented supply of power to the at least one power drive unit on the basis of a control signal of the control module, which control signal is transmitted by means of the BUS system.

In other words, the at least one power drive unit or several power drive units can be supplied with power depending on their individual requirements, wherein the requirement for power can be determined by the control module in that data relating to the power requirement is transmitted, by way of the BUS system, to the control module by the power drive units or by the at least one power drive unit.

Such a cargo loading system with a requirement-oriented supply of the at least one power drive unit makes it possible, for example, to save power and thus costs, and thus ensure an efficient cargo loading system.

According to another exemplary embodiment of the present disclosure, the cargo loading system comprises a safeguard or fuse unit for monitoring the supply of power to the cargo loading system.

In this arrangement according to another exemplary embodiment the safeguard or fuse unit can comprise at least one secondary power distribution box (SPDB), a solid state power controller (SSPC) as well as a power monitoring unit.

Such a safeguard or fuse unit can be associated with an advantage in that in the case of a possible short circuit of a component of the cargo loading system the cargo loading system can be switched off, and thus the other components are not damaged.

According to another exemplary embodiment of the present disclosure, the cargo loading system further comprises a power-supply BUS system, for example a power supply, wherein the at least one power drive unit is connected to the power-supply BUS system. The power-supply BUS system is designed for the requirement-oriented supply of power to the at least one power drive unit.

Such a cargo loading system with a power-supply BUS system for the at least one power drive unit makes it possible that only one connection to the power-supply BUS needs to be established, for example from a power supply source or power supply unit, to which power-supply BUS the at least one power drive unit or several power drive units are connected, thus obviating the need to provide discrete power supply lines from the power supply source to each of the at least one power drive units or to each of the several power drive units.

According to another exemplary embodiment of the present disclosure, the cargo loading system further comprises a maintenance system for receiving and transmitting maintenance data from/to the at least one power drive unit.

The maintenance system can be connected by means of a BUS, for example an aeronautical radio incorporated (ARINC) BUS for communicating with the control system, wherein the maintenance system collects fault messages of the at least one power drive unit, or in the case of several power drive units collects fault messages for each power drive unit, for example relating to which ones of the power drive units were defective at a particular point in time. At particular points in time the maintenance system transmits the maintenance data to a base control station, which can, for example, be arranged outside the means of transport.

Such a cargo loading system with a maintenance system makes it possible for power drive units that for example have become faulty during transport to be identified and switched off.

In this arrangement, maintenance data can be transmitted that is important to the operator and that leads to maintenance action. This data is, for example, displayed on the on-board maintenance system of an aircraft.

According to another exemplary embodiment of the present disclosure, the cargo loading system further comprises a control device that is connected to the BUS system and that is designed for controlling the at least one power drive unit by means of the control module.

The control device can be a portable control panel and can be designed for transmitting and receiving control signals and maintenance data of the at least one power drive unit. The control device can carry out the function of the control module, and can transmit and receive corresponding control signals and maintenance data by way of the BUS system to and from power drive units and further connected components, for example the maintenance and control system. In this arrangement, according to another exemplary embodiment, the control device can wirelessly communicate or exchange data with the control module and/or the BUS.

Such a cargo loading system with a control device, which is, for example, portable, makes it possible for the power drive units to be able to be controlled simply and efficiently from any desirable location in the cargo compartment or outside the cargo compartment.

According to another exemplary embodiment of the present disclosure, the cargo loading system further comprises at least one proximity switch, wherein the at least one proximity switch is designed for switching on and off the at least one power drive unit on the basis of a position of cargo, which cargo can be moved by the at least one power drive unit.

In this arrangement the at least one proximity switch can be supplied with power, independently or separately of the at least one power drive unit, for example by means of a power supply unit, and consequently independent switching on and switching off of the power drive unit is ensured, even if the power supply of the power drive unit is defective. The position of the cargo relative to the fastening device, for example a cargo latch, is determined by the power drive unit and/or the proximity switch, and on the basis of this position the proximity switch switches the power drive unit on or off. For example, when the cargo is locked by means of the fastening unit, and when the power drive unit assumes a corresponding position, the power drive unit is switched off by the proximity switch on the basis of this position.

When the cargo is locked down (with the latch in the upright position) the power drive unit is switched off. When the cargo is unlocked (with the latch in the folded-down position) the power drive unit is enabled/switched on.

Any operation of the power drive unit or of the power drive units when the cargo is locked down is prevented.

According to another exemplary embodiment of the present disclosure, an aircraft comprising a cargo loading system according to any one of the exemplary embodiments described above and below is stated, wherein at least one fastening unit for holding the cargo during cargo transport through the aircraft is stated. In this arrangement the aircraft can be a passenger aircraft or a cargo aircraft.

According to another exemplary embodiment of the present disclosure, a method for loading and unloading cargo to/from a means of transport by means of a cargo loading system according to any one of the exemplary embodiments described above and below is stated, which method comprises generating a control signal for at least one power drive unit by means of a control module; transmitting of the control signal from the control module to the at least one power drive unit by means of a BUS system; and moving cargo by means of the at least one power drive unit on the basis of the control signal transmitted by means of the BUS system.

The individual features of the various exemplary embodiments can also be combined, as a result of which, in part, advantageous effects may arise which exceed the sum of the individual effects even if these effects are not expressly described.

In one example, it should be noted that features or characteristics described so far and below with regard to the means of transport comprising the cargo loading system can also be implemented in the method and vice-versa.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
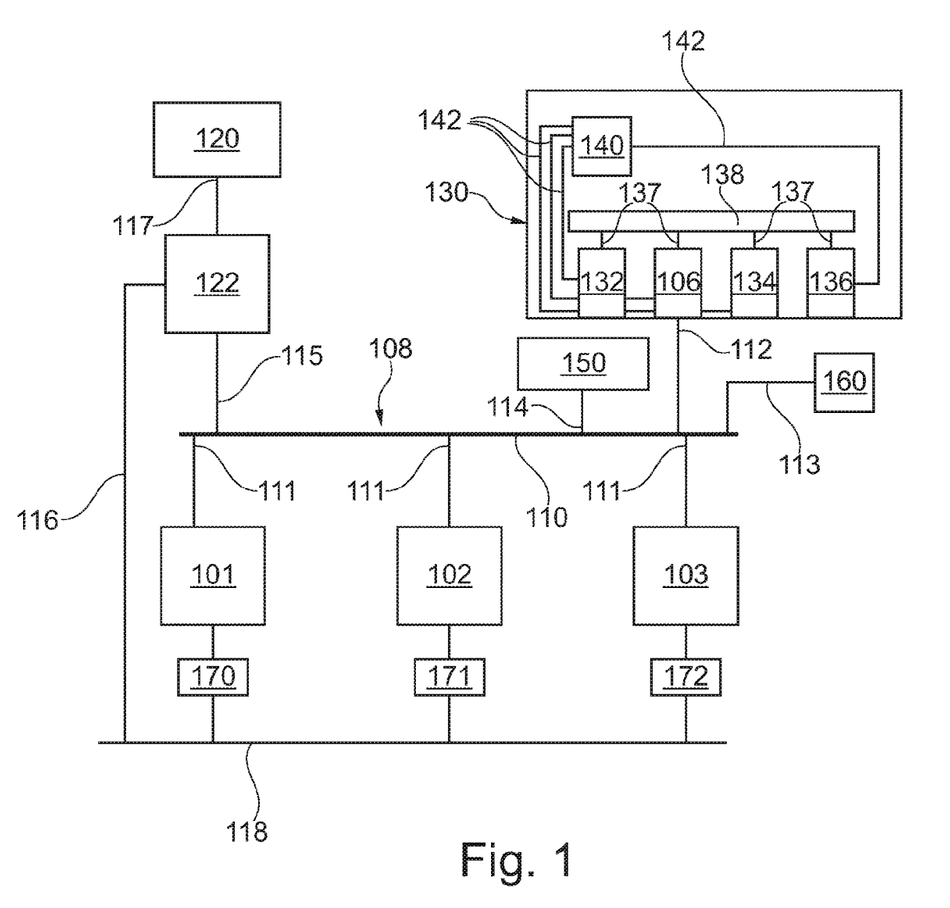
FIG. 1 shows a diagrammatic view of a cargo loading system for a cargo compartment of a means of transport, according to an exemplary embodiment of the present disclosure.

FIG. 1 describes a cargo loading system 100 for a cargo compartment of a means of transport with three power drive units 101, 102, 103 for the transport of cargo in the means of transport. The cargo loading system 100 comprises a control module 106 and a BUS system 108 with a bus 110, wherein the power drive units 101, 102, 103 and the control module 106 are connected to the bus 110 by means of data lines 111, 112. The control module 106 is designed for generating control signals for the power drive units 101, 102, 103 and maintenance data of the power drive units 101, 102, 103 for the control and maintenance of the power drive units 101, 102, 103. The BUS system 108 is designed for transmitting the control signals and maintenance data of the power drive units 101, 102, 103 between the control module 106 and the power drive units 101, 102, 103. The bus 110 can be designed as a CAN-bus 110. The control module 106 is designed for controlling the BUS system 108.

A control system 130 is stated to or on which the control module 106 is connected or integrated or plugged in, wherein the control system 130 is designed for transmitting and receiving the control signals and maintenance data from the power drive units 101, 102, 103 by means of the control module 106 and of the BUS system 108. The control system 130 is designed for processing the control signals and maintenance data. The control system 130 can be a hardware platform and is designed for the connection of further modules 132, 134, 136 that are selected from the group comprising a control system module 132 for doors, a module for supplying electrical power 134, and an undercarriage module 136 as examples of further modules. The cargo loading system 100 is designed to be switched on and off by means of at least one of the further modules 132, 134, 136 on the basis of transport phases of the means of transport. Transport phases of the means of transport can, for example, be the flight phase or the takeoff and landing phase of an aircraft.

The control system 130 comprises a module interface 138 for connecting the control module 106 and the further modules 132, 134, 136, for example by means of lines 137, that are designed for data exchange between the control module 106, which is connected to the module interface 138, and the further modules 132, 134, 136 that are connected to the module interface 138. In this way it is possible, for example, to exchange data relating to the flight phase, takeoff and landing phases as well as relating to the power supply or the undercarriage state by way of the module interface 138 between the corresponding modules 106, 132, 134, 136 and thus, for example, the cargo loading system can be correspondingly switched on or off, for example when an aircraft is in flight, which complies with the requirements of regulatory authorities.

The control system 130 further comprises a configuration unit 140 for configuring the control module 106 connected to the control system 130 and for configuring further modules 132, 134, 136 connected to the control system 130 by means of lines or channels 142. A power supply unit 120 is connected to the bus 110 of the BUS system 108 by means of a data line 115, wherein the BUS system 108 is designed for networking the power supply unit 120 with the at least one power drive unit 101, 102, 103 and with the control module 106 for supplying power to the at least one power drive unit 101, 102, 103, and to the control module 106. The control module 106 is connected to the bus 110 by means of the data line 112. The control module 106 can be plugged into the control system 130, wherein the control system 130 can be connected to the bus 110 by means of the data line 112.

Supplying power can take place in a requirement-oriented manner according to the requirements of each one of the power drive units 101, 102, 103 on the basis of control signals of the control module 106, which control signals are transmitted by means of the BUS system 108.

The cargo loading system 100 can further comprise a safeguard or fuse unit 122 for monitoring the power supply of the cargo loading system, which safeguard or fuse unit 122 is connected to the power supply unit 120 by means of a line 117, which power supply unit can, for example, be a fuel cell or a battery and/or can be supplied with current by means of a generator driven by turbines. In this arrangement the safeguard or fuse unit 122 can comprise at least one SSPC that can be connected to an SPDB, wherein a power monitoring unit is designed for monitoring the power consumption or the supply of power to the cargo loading system 100 for monitoring each of the at least one SPDBs.

By means of a data line 114 a maintenance system 150 is connected to the bus 110 of the BUS system 108 and is designed for receiving and transmitting maintenance data of the at least one power drive unit. In this arrangement the maintenance system 150 collects fault messages of the at least one power drive unit or of each individual power drive unit 101, 102, 103 and can, for example, detect which power drive unit 101, 102, 103 was defective at a given point in time. The maintenance system 150 can transmit the data, for example wirelessly, to a base control station that can be arranged outside the means of transport.

By means of a line 113 a control device 160 is connected to the bus 110 of the BUS system 108 and is designed for controlling the power drive units 101, 102, 103 by means of the control module 106. The control device 160 can be a portable control panel and can be designed for transmitting and receiving control signals and maintenance data to/from the at least one power drive unit 101, 103.

A proximity switch 170, 171, 172 is connected to each of the three power drive units 101, 102, 103 and is designed for switching on and off the power drive units 101, 102, 103 on the basis of the position of cargo that can be moved by means of the at least one power drive unit 101, 102, 103. In this arrangement, each one of the proximity switches is supplied with power independently or separately of the power drive units 101, 102 by means of the power supply unit 120. To this effect, in the exemplary embodiment of FIG. 1, for example, each one of the proximity switches is connected to a power-supply BUS 118 at which power is transmitted, by means of data lines 116 and 117, from the power supply unit 120 by way of the fuse unit 122 to the power-supply BUS 118.

Figure 2:
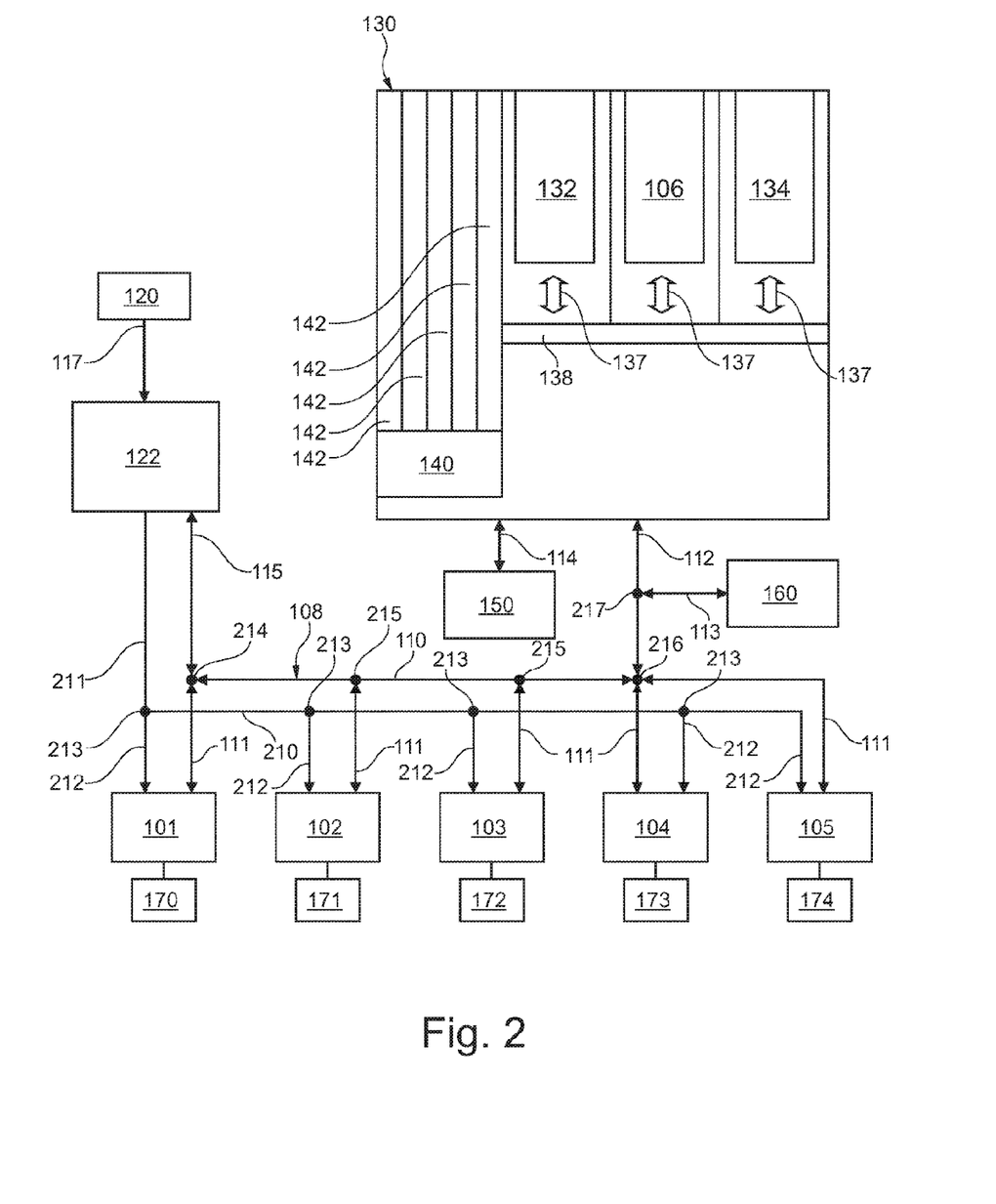
FIG. 2 shows a diagrammatic view of a cargo loading system for a cargo compartment of a means of transport, according to another exemplary embodiment of the present disclosure.

FIG. 2 diagrammatically describes the cargo loading system according to FIG. 1, except that apart from the BUS system 108 with the bus 110 for the transmission of control signals and maintenance data a power-supply BUS system 210 is provided to which several power drive units 101, 102, 103, 104, 105 are connected to nodal points 213 by means of lines 212, wherein the power-supply BUS system 210 is supplied with power by way of a power supply line 211 that is connected to the bus 210 at a nodal point 213. In this arrangement the power supply line 211 is connected to a safeguard unit 122 by way of which safeguard unit 122 power from a power supply unit 120 is transmitted by means of the line 117 to the power supply line 211, if applicable depending on the requirements of the individual power drive units 101, 102, 103, 104, 105.

In a manner that differs from that in the exemplary embodiment of FIG. 1, in the embodiment of FIG. 2 the supply of power to the proximity switches 170, 171, 172, 173, 174 does not take place separately of the supply of power to the power drive units 101, 102, 103, 104, 105, but instead directly by way of the respective power drive units 101, 102, 103, 104, 105.

The BUS system 108 comprises a bus 110 to which the fuse unit 120 is connected to the node 214 by way of the line 115, and the power drive units 101, 102, 103, 104, 105 are connected to the nodes 214 and 215, in each case by means of a line 111.

When compared to the exemplary embodiment of FIG. 1, the control system 130 comprises only the control module 106, the control system module for doors 132, and the module for supplying electrical power 134, wherein corresponding signals or data can be exchanged among the modules 106, 132, 134 by means of the module interface 138. The configuration unit 140 is correspondingly designed for configuring the modules 106, 132 and 134, which are connected to or integrated in the control system 130, by means of the channels 142.

By means of a bus 114, for example an aeronautical radio incorporated (ARINC) bus, the maintenance system 150 is connected directly to the control system 130. The control system 130 is, furthermore, directly connected, by way of a bus 112, to the nodal point 216 of the bus 110. The control device 160 is connected to a nodal point 217 of the bus 112 by means of a line or a bus 113.

Figure 3:
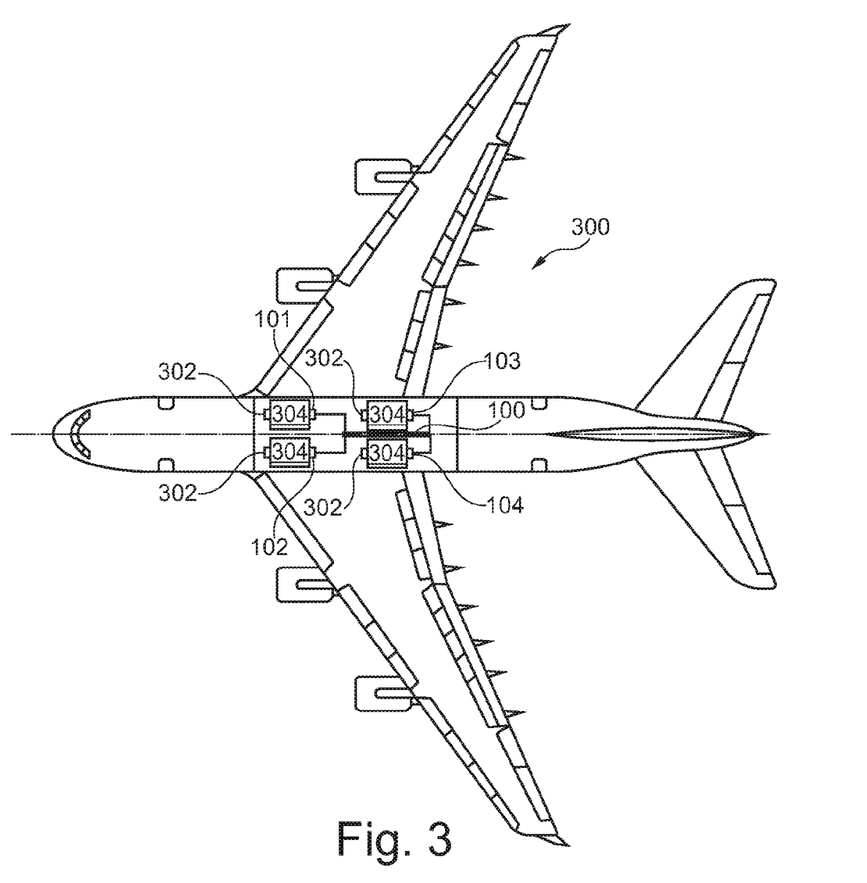
FIG. 3 shows a diagrammatic view of an aircraft comprising a cargo loading system according to an exemplary embodiment of the present disclosure.

FIG. 3 shows an aircraft 300 as an exemplary embodiment of a means of transport 300 with a cargo loading system 100 according to FIGS. 1 and/or 2 with corresponding power drive units 101, 102, 103, 104 for moving cargo 304 that is held or fastened by means of the fastening unit 302 during cargo transport through the aircraft 300.

Figure 4:
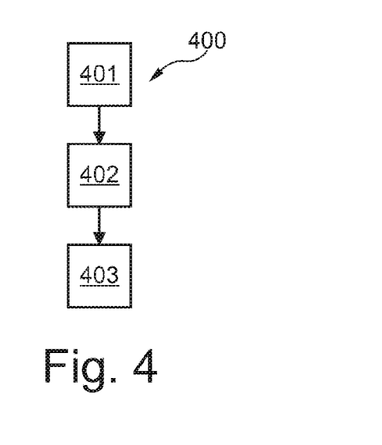
FIG. 4 shows a diagrammatic view of a flow chart of a method for loading and unloading cargo to/from a means of transport by means of a cargo loading system according to an exemplary embodiment of the present disclosure.

In FIG. 4 a flow chart of a method 400 for loading and unloading cargo to/from a means of transport by means of the cargo loading system is stated, which method involves generating 401 a control signal for at least one power drive unit by means of a control module; involves transmitting 402 the control signal from the control module 106 to the at least one power drive unit by means of a BUS system; and involves moving 403 cargo by means of the at least one power drive unit on the basis of the control signal transmitted by means of the BUS system.

Although the present disclosure has been described with reference to the exemplary embodiments, various alterations and modifications can be carried out without leaving the protective scope of the present disclosure. A cargo loading system can be used both in a cargo compartment in an aircraft, and in any other means of transport, for example in rail vehicles, watercraft, spacecraft as well as in airplanes and helicopters.

In addition, it should be pointed out that "comprising" does not exclude other elements or steps, and "a" or "an" does not exclude a plural number. In particular, the cargo loading system for a cargo compartment in a means of transport can, for example, comprise more than one power drive unit, more than one control module, more than one BUS system, more than one control system, more than one power supply unit, more than one fuse unit, more than one power-supply BUS system, more than one maintenance system, more than one control device, more than one proximity switch; the control system can comprise more than one module interface, more than one configuration unit, more than one module; and the aircraft can comprise more than one cargo loading system and more than one fastening unit.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A cargo loading system for a cargo compartment of a means of transport, with the cargo loading system comprising:
   at least one power drive unit for transporting cargo of the means of transport;
   a control module that generates control signals for the at least one power drive unit and maintenance data of the at least one power drive unit for control and maintenance of the at least one power drive unit;
   a BUS system including a BUS, with the at least one power drive unit and the control module coupled to the BUS by means of data lines; and
   a control system coupled to the control module, the control system transmits and receives the control signals and maintenance data of the at least one power drive unit by means of the control module and of the BUS system, and processes the control signals and maintenance data, and the control system is connected to further modules that include a control system module for doors, and an undercarriage module, and the cargo loading system is switched on and off by the control system based on a transport phase of the means of transport indicated by the control system module for doors and the undercarriage module, wherein the BUS system transmits the control signals and maintenance data of the at least one power drive unit between the control module and the at least one power drive unit.

2. The cargo loading system of claim 1, wherein the control module controls the BUS system.

3. The cargo loading system of claim 1, with the control system further comprising:
a module interface that connects the control module and the further modules,
wherein the module interface is designed for data exchange between the control module connected to the module interface and to the further modules connected to the module interface.

4. The cargo loading system of claim 1, with the control system further comprising:
a configuration unit that configures the control module that is connected to the control system, and configures further modules connected to the control system.

5. The cargo loading system of claim 1, further comprising:
a power-supply BUS system, the at least one power drive unit coupled to the power-supply BUS system,
wherein the power-supply BUS system is designed for a requirement-oriented supply of power to the at least one power drive unit.

6. The cargo loading system of claim 1, further comprising:
a maintenance system that receives maintenance data from and transmits maintenance data to the at least one power drive unit.

7. The cargo loading system of claim 1, further comprising:
a control device coupled to the BUS system,
wherein the control device controls the at least one power drive unit by means of the control module.

8. The cargo loading system of claim 1, further comprising:
at least one proximity switch that switches on and off the at least one power drive unit depending on a position of cargo, which cargo is movable by the at least one power drive unit.

9. The cargo loading system of claim 1, further comprising:
a power supply unit,
wherein the BUS system is designed for cross-linking the power supply unit with the at least one power drive unit and with the control module for supplying power to the at least one power drive unit and to the control module.

10. The cargo loading system of claim 9, wherein the power supply is designed for a requirement-oriented supply to the at least one power drive unit depending on a control signal of the control unit, which control signal is transmitted by means of the BUS system.

11. The cargo loading system of claim 9, further comprising:
a safeguard unit that at least one of controls and regulates the power supply of the cargo loading system.

12. An aircraft comprising:
at least one fastening unit for holding cargo during cargo transport through the aircraft;
a cargo loading system for a cargo compartment of the aircraft, with the cargo loading system including:
at least one power drive unit for transporting cargo of the means of transport;
a control module that generates control signals for the at least one power drive unit and maintenance data of the at least one power drive unit for control and maintenance of the at least one power drive unit;
a BUS system comprising a BUS, with the at least one power drive unit and the control module coupled to the BUS by means of data lines,
a control system coupled to the control module, the control system transmits and receives the control signals and maintenance data of the at least one power drive unit by means of the control module and of the BUS system, and processes the control signals and maintenance data, and the control system is connected to further modules that include a control system module for doors, and an undercarriage module, the control system module for doors and the undercarriage module generate information relating to a transport state of the aircraft that is transmitted to the control system, and the cargo loading system is switched on and off by the control system based on the transport phase of the aircraft, with the cargo loading system switched off during a flight phase of the aircraft, and
wherein the BUS system transmits the control signals and maintenance data of the at least one power drive unit between the control module and the at least one power drive unit.

13. The aircraft of claim 12, further comprising:
a maintenance system that receives maintenance data from and transmits maintenance data to the at least one power drive unit.

14. The aircraft of claim 12, further comprising:
a safeguard unit that at least one of controls and regulates the power supply of the cargo loading system.

15. The aircraft of claim 12, further comprising:
at least one proximity switch that switches on and off the at least one power drive unit depending on a position of cargo, which cargo is movable by the at least one power drive unit.

16. A method for loading cargo to and unloading cargo from a means of transport by means of a cargo loading system, with the cargo loading system comprising:
at least one power drive unit for transporting cargo of the means of transport;
a control module that generates control signals for the at least one power drive unit and maintenance data of the at least one power drive unit for control and maintenance of the at least one power drive unit;
a BUS system including a BUS, with the at least one power drive unit and the control module are coupled to the BUS by means of data lines, and the BUS system transmits the control signals and maintenance data of the at least one power drive unit between the control module and the at least one power drive unit,
a control system coupled to the control module, the control system transmits and receives the control signals and maintenance data of the at least one power drive unit by means of the control module and of the BUS system, and processes the control signals and maintenance data, and the control system is connected to further modules for receiving data, the further modules including a control system module for doors, and an undercarriage module, the control system module for doors and the undercarriage module generating information indicating that the means of transport is in a driving state, with the method comprising:

generating a control signal for at least one power drive unit by means of the control module based on data received from the further modules;

transmitting the control signal from the control module to the at least one power drive unit by means of the BUS system;

moving cargo by means of the at least one power drive unit depending on the control signal transmitted by means of the BUS system; and switching off the cargo loading system by the control system based on the indication that the means of transport is in the driving state.

* * * * *